United States Patent
Tellez et al.

(10) Patent No.: US 6,820,262 B1
(45) Date of Patent: Nov. 16, 2004

(54) METHOD FOR COMPUTING THE DEGREE OF PARALLELISM IN A MULTI-USER ENVIRONMENT

(75) Inventors: Juan Tellez, San Francisco, CA (US); Benoit Dageville, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/360,286

(22) Filed: Jul. 22, 1999

(51) Int. Cl.[7] ................................................. G06F 9/46
(52) U.S. Cl. ...................................................... 718/106
(58) Field of Search ................................ 709/100, 105, 709/104; 712/20; 717/749; 707/10; 718/106

(56) References Cited

U.S. PATENT DOCUMENTS

| | | | | |
|---|---|---|---|---|
| 5,325,525 A | * | 6/1994 | Shan et al. ................. 709/104 |
| 5,708,836 A | * | 1/1998 | Wilkinson et al. ............. 712/20 |
| 5,768,594 A | * | 6/1998 | Blelloch et al. ............. 717/149 |
| 6,292,822 B1 | * | 9/2001 | Hardwick .................... 709/105 |
| 6,496,823 B2 | * | 12/2002 | Blank et al. ................... 707/10 |

OTHER PUBLICATIONS

Advanced Computer Architecture: Parallelism, Scalability, Programmability, McGraw–Hill, 1993, p. 63–68, 84–86, 105–108, 132–141, 671–673, 677–679.*

* cited by examiner

Primary Examiner—John Follansbee
Assistant Examiner—Dustin Nguyen
(74) Attorney, Agent, or Firm—Hickman Palermo Truong & Becker LLP; Edward A. Becker (57) ABSTRACT

A method and apparatus are provided for computing degrees of parallelism for parallel operations in a computer system. The degree of parallelism for a given parallel operation is computed based on a set of factors. The set of factors includes a target degree of parallelism that represents a desired total amount of parallelism in the computer system, a current workload and a requested degree of parallelism.

66 Claims, 8 Drawing Sheets

FIG. 1

| | | 1 | 2 | 3 | 4 | 5 | 6 | 7 | 8 |
|---|---|---|---|---|---|---|---|---|---|
| 201 | dop | 16 | | | | | | | |
| 202 | dop | 16 | 4 | | | | | | |
| 203 | dop | 16 | 4 | 2 | | | | | |
| 204 | dop | 16 | 4 | 2 | 1 | | | | |
| 205 | dop | 16 | 4 | 2 | 1 | 1 | | | |
| 206 | dop | 16 | 4 | 2 | 1 | 1 | 1 | | |
| 207 | dop | 16 | 4 | 2 | 1 | 1 | 1 | 1 | |
| 208 | dop | 16 | 4 | 2 | 1 | 1 | 1 | 1 | 1 |
| 209 | dop | 2 | 4 | 2 | 1 | 1 | 1 | 1 | 1 |
| 210 | dop | 2 | 3 | 2 | 1 | 1 | 1 | 1 | 1 |
| 211 | dop | 2 | 3 | 3 | 1 | 1 | 1 | 1 | 1 |
| 212 | dop | 2 | 3 | 3 | 2 | 1 | 1 | 1 | 1 |
| 213 | dop | 2 | 3 | 3 | 2 | 2 | 1 | 1 | 1 |
| 214 | dop | 2 | 3 | 3 | 2 | 2 | 2 | 1 | 1 |
| 215 | dop | 2 | 3 | 3 | 2 | 2 | 2 | 2 | 1 |
| 216 | dop | 2 | 3 | 3 | 2 | 2 | 2 | 2 | 1 |
| 217 | dop | 2 | 3 | 3 | 2 | 2 | 2 | 2 | 1 |
| 218 | dop | 2 | 2 | 3 | 2 | 2 | 2 | 2 | 1 |
| 219 | dop | 2 | 2 | 2 | 2 | 2 | 2 | 2 | 1 |
| 220 | dop | 2 | 2 | 2 | 2 | 2 | 2 | 2 | 1 |
| 221 | dop | 2 | 2 | 2 | 2 | 2 | 2 | 2 | 1 |
| 222 | dop | 2 | 2 | 2 | 2 | 2 | 2 | 2 | 1 |
| 223 | dop | 2 | 2 | 2 | 2 | 2 | 2 | 2 | 1 |
| 224 | dop | 2 | 2 | 2 | 2 | 2 | 2 | 2 | 2 |
| 225 | dop | 2 | 2 | 2 | 2 | 2 | 2 | 2 | 2 |
| 226 | dop | 2 | 2 | 2 | 2 | 2 | 2 | 2 | 2 |
| 227 | dop | 2 | 2 | 2 | 2 | 2 | 2 | 2 | 2 |
| 228 | dop | 2 | 2 | 2 | 2 | 2 | 2 | 2 | 2 |
| 229 | dop | 2 | 2 | 2 | 2 | 2 | 2 | 2 | 2 |
| 230 | dop | 2 | 2 | 2 | 2 | 2 | 2 | 2 | 2 |
| 231 | dop | 2 | 2 | 2 | 2 | 2 | 2 | 2 | 2 |
| 232 | dop | 2 | 2 | 2 | 2 | 2 | 2 | 2 | 2 |

Rows 201–208: Cycle 1; Rows 209–216: Cycle 2; Rows 217–224: Cycle 3; Rows 225–232: Cycle 4.

METHOD FOR COMPUTING THE DEGREE OF PARALLELISM IN A MULTI-USER ENVIRONMENT

FIELD OF THE INVENTION

This invention relates to databases and, more specifically, to methods and apparatus for computing the degree of parallelism in a multi-user environment.

BACKGROUND OF THE INVENTION

The central processing unit ("CPU") is the brains of the computer and represents the computing power of the computer. Thus, a computer program can run faster if there are two CPUs executing the computer program rather than if only one CPU is executing it. The simultaneous use of more than one CPU to execute the computer program is known as parallel processing or parallel computing. Parallel processing works by dividing a computer program into several individual processes to be parceled out to available CPUs. Parallel processing is one way to improve the efficient use of the computer's brain power by not allowing any of the computer's CPUs to remain idle. Thus, in general, parallel processing is preferred over serial processing when the goal is to execute a computer program faster and when there is more than one CPU available to execute the computer program.

An example of an instance where more than one CPU is available for executing a computer program is that some large computers house several CPUs. Another example is a computer cluster where several single-CPU computers are connected in such a way as to behave like a single computer. A cluster is a good example a system in which several relatively cheap computers are purposely coupled to achieve comparable computing power of a powerful but expensive single-CPU computer. Clustering also enables companies to leverage the investment already made in PCs and workstations. Moreover, new CPUs can be easily added by adding a new PC or workstation to the cluster. The cluster may comprise several nodes located at various sites, as in local-area-networks (LANs)

While parallel processing is a highly useful concept, it is no panacea. In fact, parallel processing has its own set of problems. When more than one user attempts to perform parallel processing to use all of the available CPUs, the users are in competition for the same CPUs. Each user will attempt to monopolize all the CPUs. Thus, the computer quickly becomes overstressed because there is no cooperation in managing the CPUs of the computer. In one approach, the users' computer tasks ("jobs") are queued as they arrive, and only a very small number of parallel jobs are allowed to run at any given time.

One environment in which efficient parallel processing techniques are critical is within database systems. For the purposes of illustration, one approach to parallel processing is described herein in the context of parallel execution of queries and database operations. In typical database systems, users store, update and retrieve information by submitting commands to a database server. To be correctly processed, the commands must comply with the database language that is supported by the database server. One popular database language is known as Structured Query Language (SQL). Database commands submitted to database servers that support the SQL language are typically in the form of SQL statements.

A SQL statement comprises either a query or a combination of a query and data manipulation operations to be performed on a database. The query portion and the data manipulation operations are herein referred to as "operations". Thus, an "operation" in a parallel execution environment is hereafter referred to as a "parallel operation". For purposes of simplification, a user that submits a parallel operation is hereafter referred to as a "parallel user".

With parallel execution, multiple parallel server processes work together simultaneously to execute a single SQL statement. The number of parallel server processes, also known as "slave processes", assigned to perform a single parallel operation is referred to as the degree of parallelism for that operation. It is possible for multiple slave processes to work on a single parallel operation because the parallel operation is divided into multiple portions, hereafter referred to as "work granules". By assigning a degree of parallelism to each parallel operation that is entering the system, the database system dictates how the work to be done is shared among the CPUs.

To efficiently process a SQL statements, an efficient technique for determining the degree of parallelism is required. If the degree of parallelism assigned to incoming operations is too high, then the operations must contend for the same CPUs. If the degree of parallelism assigned to incoming operations is too low, then some CPUs that could be used for processing the operations may remain idle.

According to one approach for assigning degrees of parallelism to operations, the degree of parallelism assignment mechanism assigns each parallel operation seeking entry into the system a degree of parallelism equal to the number of CPUs divided by X, where X equals the total number of parallel operations present on the system plus the number of parallel operations that are presently seeking entry into the system. However, this approach is unable to accommodate both parallel and serial jobs simultaneously.

In yet another approach, a maximum number of parallel server processes and an allocation unit is predetermined for a given system. Assume that the number of parallel server processes is set at 100 and the allocation unit is set at 10. Each parallel operation that enters the system is assigned a degree of parallelism equal to the allocation unit, 10. However, as the system is close to exhausting the maximum number of parallel server processes, subsequent parallel operations entering the system are assigned a diminished degree of parallelism. For purposes of illustration, assume that once 90% of the parallel server processes have been exhausted, subsequent parallel operations entering the system are assigned a diminished degree of parallelism. For example, the first 9 parallel operations to enter the system will each be assigned a degree of parallelism of 10. The tenth and eleventh parallel operation entering the system may only be assigned a degree of parallelism of 6 and 4 respectively.

One drawback to this approach is that the first parallel operation to enter the system uses only a small fraction of the available resources (e.g. only 10 of 100 available CPUs) even if it remains the only parallel operation on the system. Instead, as in our example, the first parallel operation is assigned only 10 degrees of parallelism. Even if no other parallel operation seeks to enter the system, the degree of parallelism remains equal to the allocation unit. Thus, in the case where there is only one parallel operation on the system, 90% of the resources remain unused. This approach makes for inefficient use of system resources in cases where there are low numbers of parallel operations on the system.

Another drawback to this approach is a lack of fairness in allocating the degree of parallelism to parallel operations. Referring to our example above, assume that the eighth and ninth parallel operations terminate while parallel operations 1 to 7 and 10 to 11 remain active in the system. The next four parallel operations that seek entry into the system will be assigned 10, 10, 1, 1 degrees of parallelism respectively, even if they entered the system at approximately the same time. Thus, the third and fourth parallel operations that just entered the system will perceive the system to be unfair.

Based on the foregoing, there is a need for a method or mechanism for computing the degree of parallelism in a multi-user environment with the goal of maximizing the use of available system resources.

SUMMARY OF THE INVENTION

The foregoing needs and objects, and other needs and objects that will become apparent from the following description, are achieved by the present invention, which comprises, in one aspect, a method for computing degrees of parallelism in a multi-user environment for a computer system, the method comprising receiving an operation associated with a requested degree of parallelism; computing the degree of parallelism based on a target degree of parallelism, a current workload load of the computer system; and the requested degree of parallelism; and assigning the computed degree of parallelism to the operation.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system are described for computing the degree of parallelism in a multi-user environment. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
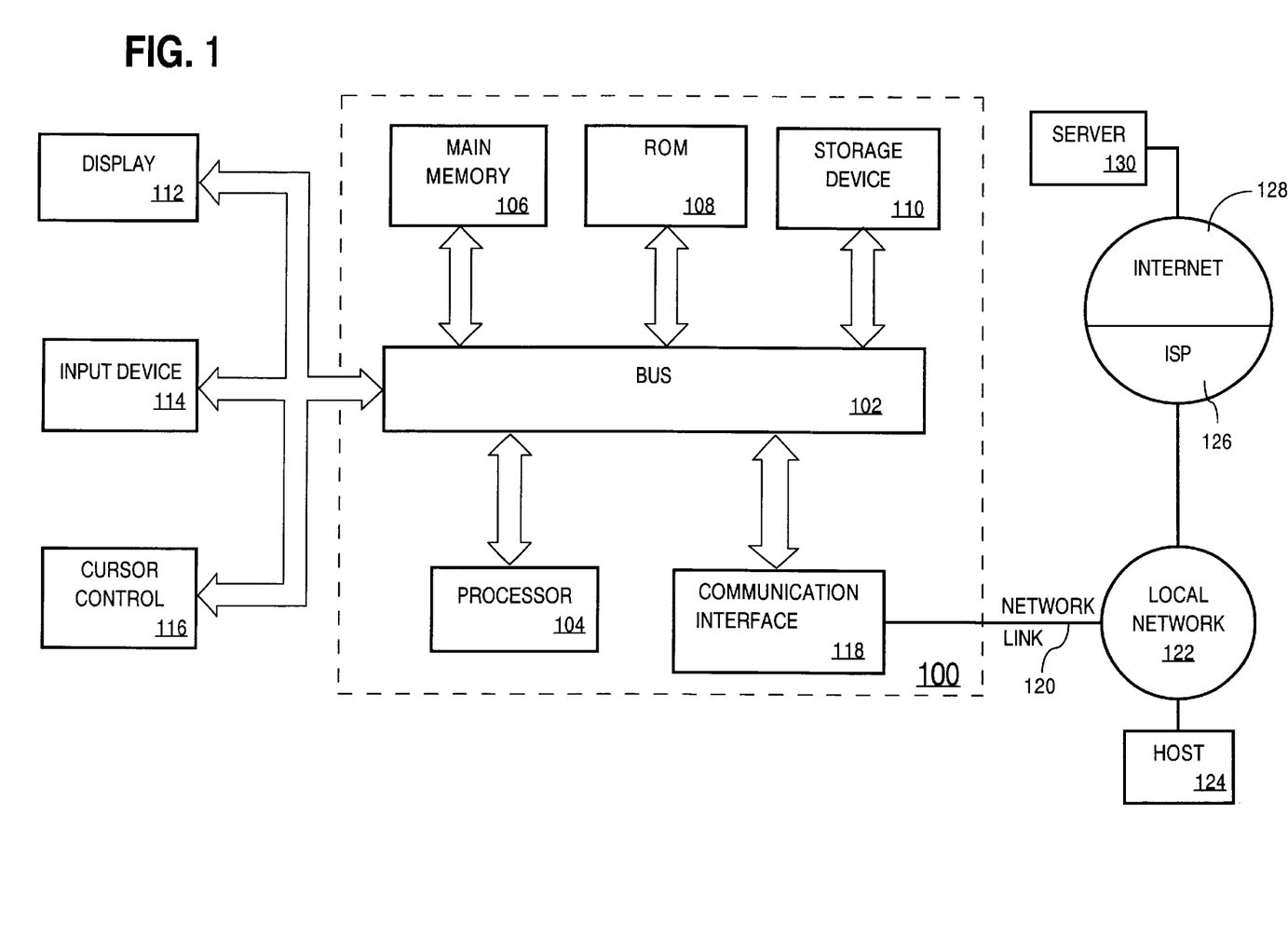
FIG. 1 is a block diagram illustrating a computer system on which embodiments of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for computing the degree of parallelism in a multi-user environment. According to one embodiment of the invention, computing the degree of parallelism in a multi-user environment is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for computing the degree of parallelism in a multi-user environment as described herein.

The received code may be executed by processor 104 as it is received, and/or stored in storage device 110, or other non-volatile storage for later execution. In this manner, computer system 100 may obtain application code in the form of a carrier wave.

Functional Overview

One of the objectives of parallel processing is to divide a parallel operation into multiple work granules that can be executed concurrently in order to take advantage of the available resources on the computer system. The system would become overstressed, for example, if multiple parallel users attempt to use 100% of the resources, resulting in a tug of war for resources that causes wasted time due to context switching. On the other hand, resources can be managed by dividing them among the various parallel operations by assigning each entering parallel operation an appropriate degree of parallelism such that, during steady state conditions, all the parallel operations on the system execute at approximately the same degree of parallelism and use all of the available resources without contending for them. The calculation of the degree of parallelism is described in the context of transient and steady state conditions as further explained below. In the embodiment of the invention, the objective of not overstressing the system is achieved by dynamically adapting the degree of parallelism by appropriately reducing it for each successive parallel operation entering the system.

In one embodiment of the invention, the rate of reduction of the degree of parallelism dynamically adapts to the number of parallel operations on the system and to the degree of parallelism already assigned to such parallel operations. However the invention is not limited to any specific embodiment. For example, the rate of reduction of the degree of parallelism may instead be dynamically adapted to the number of parallel users on the system, where each parallel user submits a number of parallel operations. Also, in one embodiment, the rate of reduction of the degree of parallelism may be adapted based on the run queue length of the operating system, or based on some value that expresses the amount of memory being used in the system.

The degree of parallelism is calculated based on the above considerations as expressed in an empirical formula further described hereafter. For purposes of illustration, a scenario shall be described in which a number of parallel operations enter a system that has 8 CPUs. In one embodiment of the invention, the degree of parallelism assigned to each successive parallel operation is dynamically adapted to result in a system load that is close to the maximum capacity of the system, referred to herein as the "target". One measure of the load on the system is known as the load factor and is defined to be the total load on the system divided by the target. Thus, if at a given point in time the total load on a system is 200, and the target for the system is 100, the load factor for the system at that point in time is 2.

In one embodiment of the invention, the target is equal to twice the number of CPUs in the system. Thus, in the 8 CPU scenario that shall be described, the target is equal to 16. For purposes of illustration, assume that, initially, 8 parallel operations enter an idle system, one at a time in rapid succession, and exit in the order they entered. The rapid entry is intended to simulate a burst of parallel operations entering the system. For the purpose of explanation, it shall be assumed that, at any given point in time, there continue to be 8 parallel operations on the system. Thus, as each of the 8 initial parallel operation exits the system, it is replaced by another parallel operation entering the system.

The above scenario is not a typical parallel computing case, but does serve to illustrate the adaptive and dynamic characteristics of the techniques described herein for assigning the degree of parallelism to parallel operations as they enter the system. The techniques apply equally well to cases where a random number of parallel operations enter and leave the system.

Figure 2:
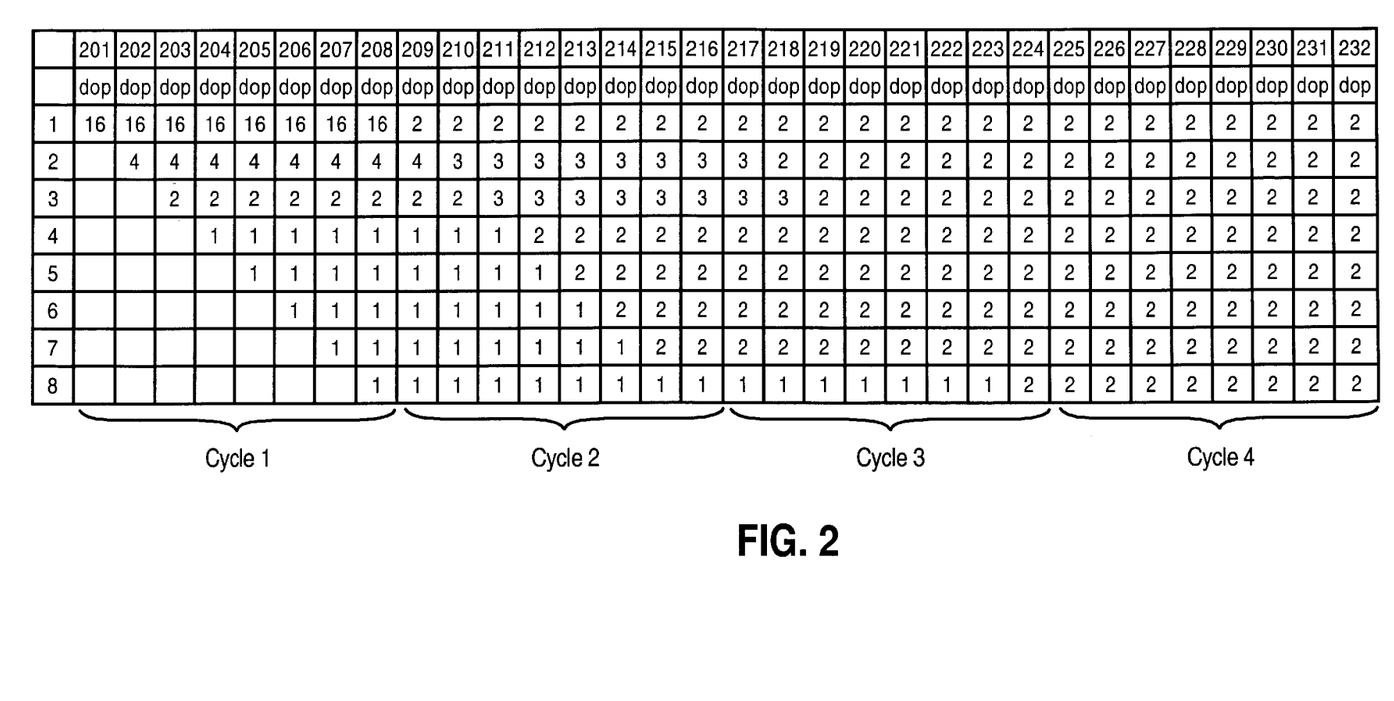
FIG. 2 is a table showing the degree of parallelism assigned to parallel operations entering the system.

FIG. 2 is a table showing the degree of parallelism assigned to parallel operations entering the system in the scenario described above. Each of the rows 1–8 correspond to the eight parallel operations that exist in the system at any given point in time. Each of the columns corresponds to a particular point in time. Specifically, the first eight columns 201 to 208 show the degree of parallelism assigned to first eight parallel operations as they enter the system. For example, column 201 corresponds to the point in time in which the first of the eight initial parallel operations enters the system, and shows that the first parallel operation to enter the system is assigned a degree of parallelism equal to 16. After assigning the first parallel operation a degree of parallelism of 16, the load factor of the system is 1.

Column 202 corresponds to the point in time in which the second of the eight initial parallel operations enters the system, and shows that the degree of parallelism of the first operation remains at 16 and the second parallel operation to enter the system is assigned a degree of parallelism of 4. The next 6 consecutive parallel operations to enter the system are assigned degrees of parallelism equal to 2, 1, 1, 1, 1, and 1 respectively. Each column in FIG. 2 shows the degree of parallelism of all parallel operations in the system at any given time.

Because the first parallel operation to enter the system encountered an idle system, it was assigned 100% of the resources. Each succeeding parallel operation to enter the system was assigned a markedly reduced degree of parallelism in order to avoid overstressing the system, but yet attempting to apportion the resources fairly among the parallel operations. The progression towards fairness in allocation of degree of parallelism is seen in FIG. 2. The first row of column 209 of FIG. 2 shows the degree of parallelism of the ninth parallel operation entering the system and which replaces the first parallel operation that has just exited the system. Likewise, the second row of column 210 shows the degree of parallelism of the tenth parallel operation entering the system and which replaces the second parallel operation that has just exited the system.

The first batch of 8 parallel operations to enter the system can be considered to be a first cycle, the second batch of 8 to be a second cycle, and so forth. By the end of the third cycle, all the parallel operations on the system have achieved the same degree of parallelism. Referring to FIG. 2, columns 201 to 208 represent cycle 1. Columns 209 to 216 represent cycle 2. Likewise, columns 217 to 224 and columns 225 to 232 represent cycles 3 and 4 respectively.

Another objective of parallel processing is to use all or most of the available computational resources in the computer system at any given time. As in our example, if there is only one parallel operation to be executed in a parallel server environment, then, according to one embodiment of the invention, the degree of parallelism assigned to the lone parallel operation is such that all of the available computing power is used to execute the lone parallel operation. Referring to FIG. 2, the first parallel operation to enter an idle system (zero load) will be assigned a degree of parallelism equal to target. Since there is only one parallel operation on the system, the lone parallel operation the system is assigned a degree of parallelism equal to the target in order to avoid underutilizing the system resources.

Requested Degree of Parallelism

Each parallel operation may be associated with a "requested" degree of parallelism. The requested degree of parallelism for an operation is the degree of parallelism that is "desired" for the operation. The requested degree of parallelism for an operation may be specified, for example, by a database administrator through an operational parameter, or by the user that submits the request to perform the operation.

Typically, the requested degree of parallelism does not take into account the current usage of the system, and therefore does not represent the optimal degree of parallelism to actually assign to the parallel operation. In the scenario given above, it was assumed that all parallel operations desired to use as many resources as possible. Therefore, it was assumed that the requested degree of parallelism for each of the parallel operations was equal to the target. However, the system administrator may configure the requested degree of parallelism to be less than target. If there is no requested degree of parallelism, the requested degree of parallelism is assumed to be equal to target (default value). As mentioned in the scenario above, the first parallel operation to enter an idle system (zero load) will be assigned a degree of parallelism equal to target unless the requested degree of parallelism is specified to be less than target.

According to the embodiment of the invention, the degree of parallelism that is requested for a particular operation is one of the factors that is taken into account in determining that actual degree of parallelism assigned to the operation, as shall be described in greater detail hereafter.

Degree of Parallelism Calculation

In one embodiment of the invention, the degree of parallelism is calculated using the following empirical formulae:

if load=0, then DOP=DOP_req where,

"load" is the sum of the current load and the increase in load due to the requested degree of parallelism, i.e., load=load_current+load_DOP_req "DOP" is the degree of parallelism that is assigned by the system, "DOP_req" is the requested degree of parallelism. If the requested degree of parallelism is not specified, then it is assumed to be equal to target If load is not equal to zero, then DOP=(DOP_req/r), where "r" is the degree of parallelism reduction computation as computed below.

$r = (load/target)*2*\log(users)$ where,

"load" is the sum of the current load and the increase in load due to the requested degree of parallelism, i.e., load=load_current+load_DOP_req, "target" is a predetermined number of parallel server processes and, in one embodiment, is equal to 2*(number of CPUs), "users" is the number of parallel operations on the system. In an embodiment of the invention, "users" is the number of parallel users on the system, 2*log(users) represents the rate of change of "r" based on the number of "users".

Figure 3A:
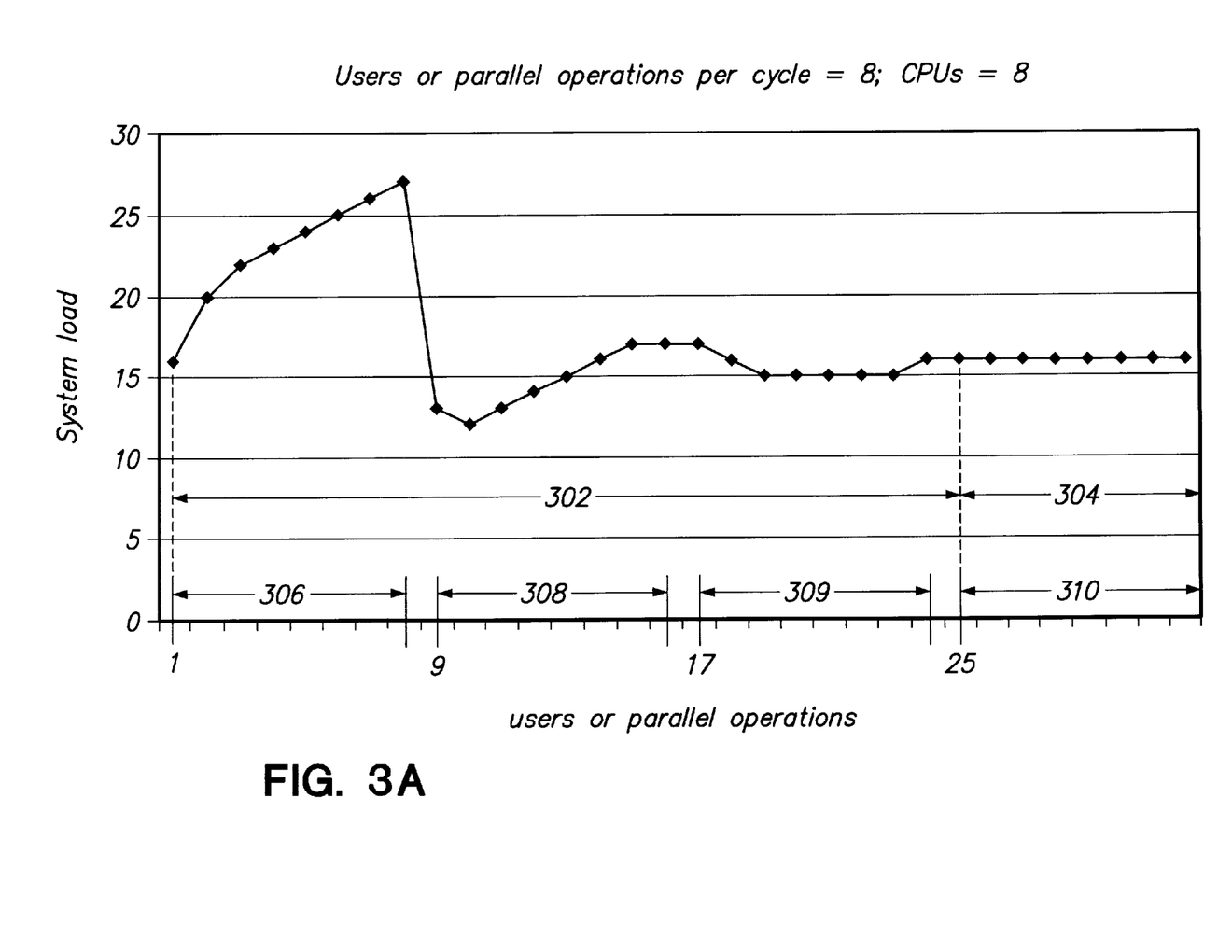
FIG. 3A is a plot illustrating the load on the system as it progresses from the transient state to steady state.

In another embodiment of the invention, the degree of parallelism is calculated using the following empirical formulae:

if load=0, then DOP=DOP_req where,

"DOP" is the degree of parallelism,

"DOP_req" is the requested degree of parallelism. If the requested degree of parallelism is not specified, then it is assumed to be equal to target if load is not equal to zero, then DOP=(DOP_req/r)

where "r" is the degree of parallelism reduction computation as computed below.

$$r = [2*(load+DOP\_def)/target] * ruser$$

where,

"load" is the sum of the current load and the increase in load due to the requested degree of parallelism, i.e., load=load_current+load_DOP_req, "DOP_def" is the default degree of parallelism and is equal to 2*(number of CPUs) in one embodiment of the invention, "target" is a predetermined number of parallel server processes and is equal to 2*(number of CPUs) in one embodiment of the invention, "ruser" is the rate of change "r" based on the "user_limit" and "user_ratio", and is calculated as belo $$ruser = [2*\{0.693 - \log(\{user\_limit-user\_ratio\}/2)\} + (0.693 - \log\{2.0 - r/4.0\})].$$

where,

"user limit" is an upper limit on the number of parallel operations on the system. In one embodiment, "user_limit" is an upper limit on the number of parallel users on the system, "user_ratio" is the number of parallel operations on the system. In other embodiments, "user_ratio" can be the number of parallel users, the run queue length or a value that expresses the amount of memory used in the system Fairness The degree of parallelism assignment techniques described above exhibit several characteristics, one of which is fairness in allocating degrees parallelism to the various parallel operations in the system. In steady state conditions, all parallel operations entering the system are assigned approximately the same degree of parallelism. Returning to the scenario illustrated in FIG. 2, when the first parallel operation enters an idle system, the state of the system is in a start-up condition where the lone parallel operation is assigned the maximum degree of parallelism in order to utilize the full computing power of the system. As parallel operations enter and exit the system, the system goes through a brief transient period where entering parallel operations are assigned varying degrees of parallelism, at values less than target. During this transient period, the total load overshoots the target by a considerable amount and then dips below target as the degree of parallelism being assigned to new parallel operations is being adapted while parallel operations exit and enter the system. However, the system very quickly reaches steady state which is characterized by having all entering parallel operations assigned equal degrees of parallelism, and so that the total load on the system is approximately equal to the target. FIG. 3A is a plot illustrating the load on the system as it progresses from the transient state to steady state. The load shown in FIG. 3A is the cumulative degree of parallelism assigned to the parallel operations on the system at a given time. In FIG. 3A, intervals 324, 326, 328, and 330 represent cycles 1 through 4 respectively. In our example, by the time the 25th parallel operation enters the system, which is the start of cycle 4, the system has reached steady state. At steady state, the cumulative load is on target, which is equal to 16. Referring to FIG. 3, the interval indicated by 301 is the transient state and the interval indicated by 302 is steady state. As can be seen in FIG. 2, at the start of cycle 4, all the parallel operations are assigned the same degree of parallelism.

Figure 3B:
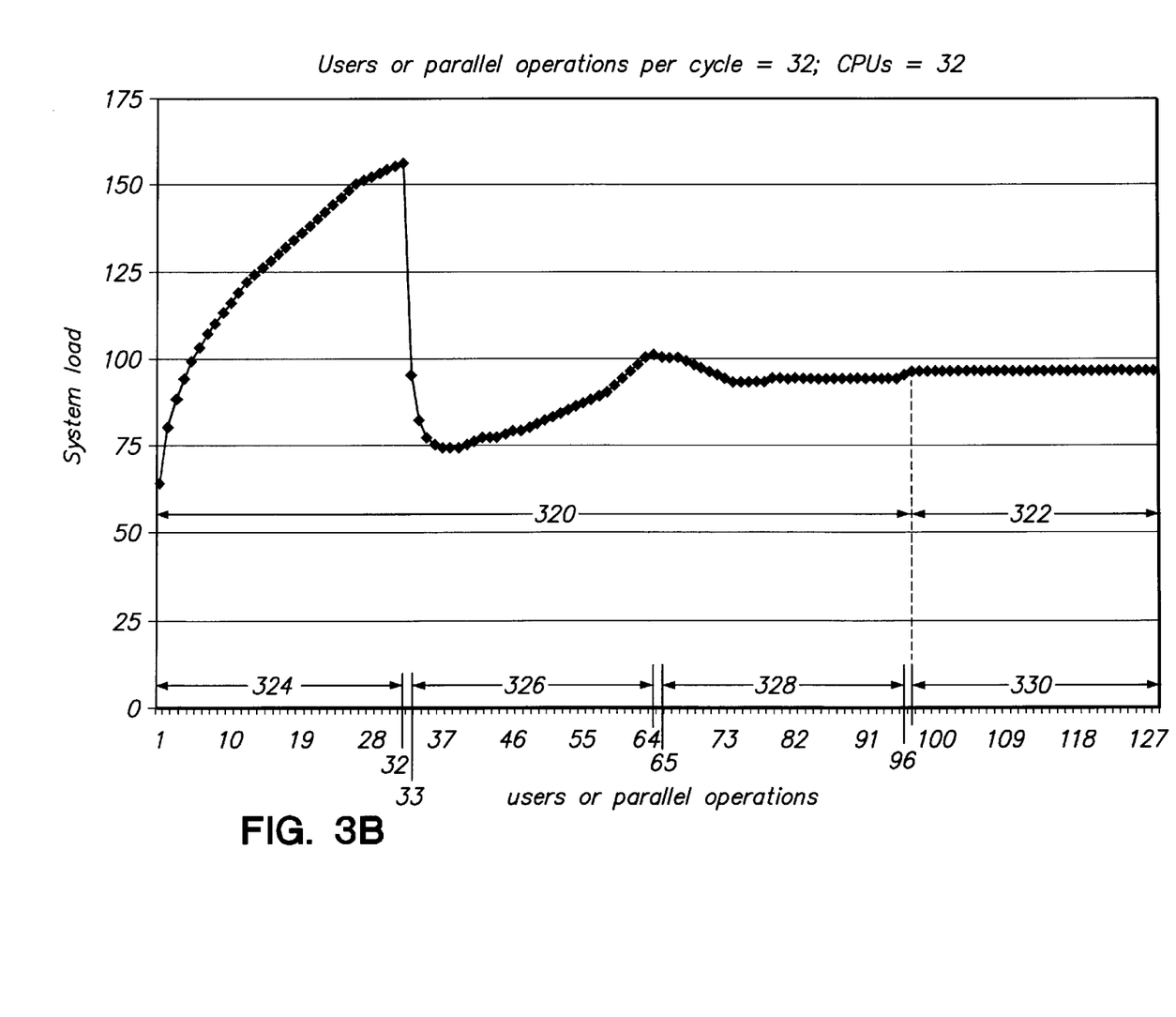
FIG. 3B illustrates a case where 32 parallel operations enter a system in rapid succession.

FIG. 3B illustrates a case where 32 parallel operations enter a system in rapid succession so that the load on the system ramps up from zero to a very high number in a short period of time. The entry in rapid succession is to simulate a sudden acceleration in the number of parallel operations and the accompanying acceleration in load on the system. As in our previous example, assume that the parallel operations enter one at a time and exit in the order they entered. However, at any given time, assume there are only 32 parallel operations on the system. As each parallel operation exits the system in the order it entered, it is replaced by another parallel operation entering the system. In FIG. 3B as in FIG. 3A, the load is in terms of the cumulative degree of parallelism assigned to the parallel operations on the system. In FIG. 3B, intervals 324, 326, 328, and 330 represent cycles 1 through 4 respectively. Interval 320 represents the transient state and interval 322 represents steady state. Assume that the first parallel operation enters an idle system. The high acceleration in load can be seen in cycle I where the cumulative load on the system ramps up from 64 (the degree of parallelism assigned to the first parallel operation to enter the system) to a cumulative load of 156, which is a load factor of 2.44. However, as can be seen in FIG. 3B, the load quickly levels off. At the start of cycle 2, the cumulative load drops to 95, which is a load factor of 1.48. Steady state is reached at the beginning of cycle 4. At steady state, all the parallel operations in the cycle have been assigned equal degrees of parallelism and for this case, the load factor is 1.5 at steady state.

Well-boundedness

The load factor resulting from using the level of parallelism assignment techniques described herein is well bound for up to 500 users. In other words, as the number of users on the system at any given time approach 500, the load factor approaches the limit of 5. However the invention is not limited to any specific embodiment. In a different embodiment of the invention, the limits may be different.

Parallel Process Allocation

Figure 4:
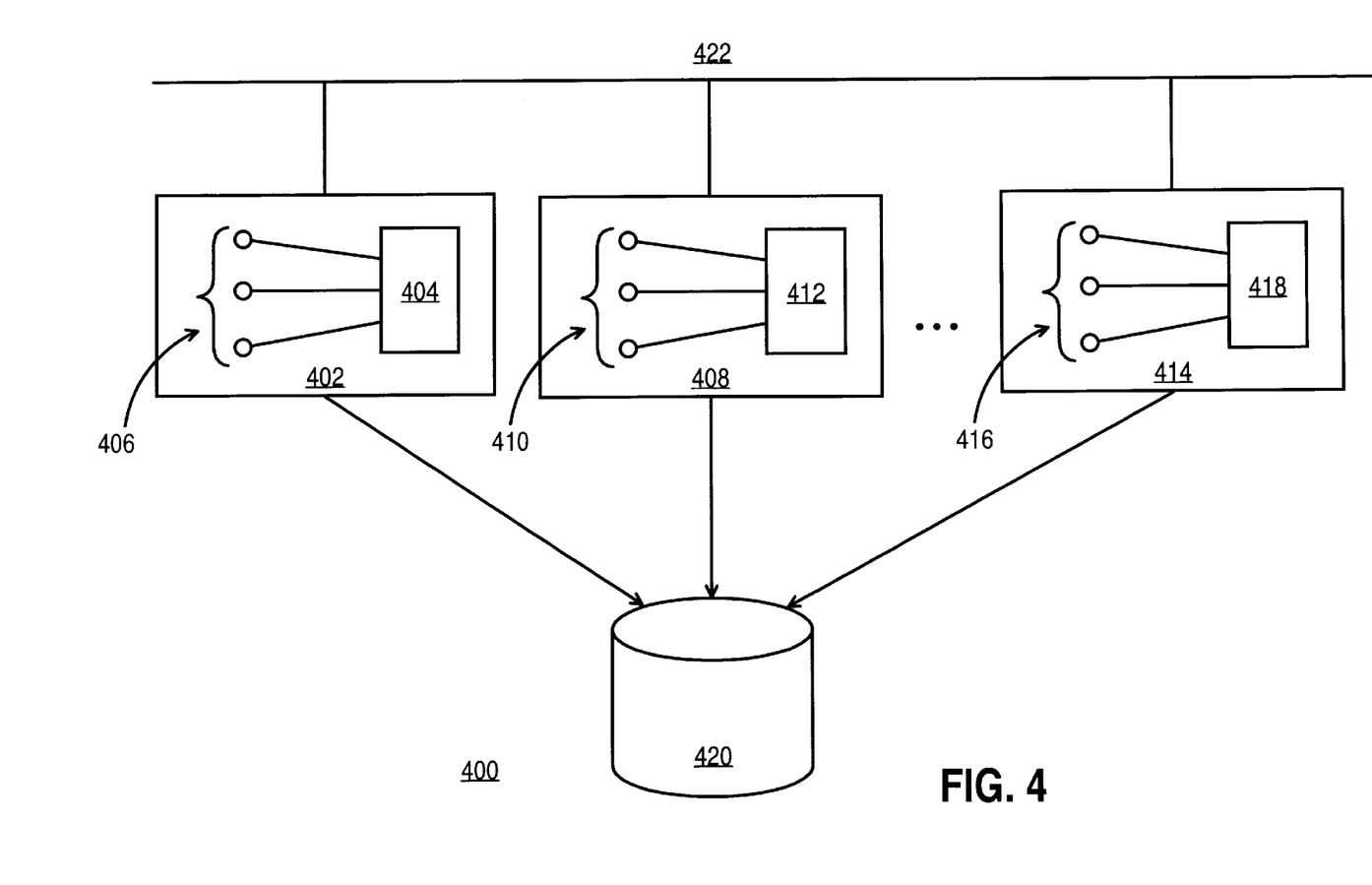
FIG. 4 illustrates a computer system, which is a shared-disk MPP architecture.

Once the degree of parallelism is calculated for a given parallel operation, the work is distributed among the various processors. The process of distribution involves parallel process allocation, which is determining which nodes should spawn slave processes. For the purposes of illustration, assume that the parallel processing is spread over several nodes in a massively parallel processing (MPP) configuration. FIG. 4 illustrates system 400, which is a shared-disk MPP architecture. Node 402 is the first node of the shared-disk MPP system. Node 408 is the second node and node 414 is the nth node of the shared-disk MPP system. Each node comprises a dynamic memory and one or more processors (CPUs). The dynamic memory in a node is shared by all the CPUs within that node. In FIG. 4, memories 404, 412, and 418 are examples of dynamic memory. CPU sets 406, 410 and 416 are examples of sets of CPUs. Each node is said to have a symmetric multiprocessing (SMP) architecture. The nodes communicate through the interconnect 422. The nodes share the persistent storage 420, which may include, for example, numerous magnetic disks.

To optimize performance, all the slave processes in the MPP system should have equal work to avoid workload skewing, which occurs when some slave processes perform significantly more work than other slave processes.

In a shared-disk MPP system, performance is improved by reducing the connectivity costs between nodes. Thus, for each parallel operation, slave processes are spawned in as few nodes as are necessary to perform the parallel operation. For example, if a parallel operation has been assigned a degree of parallelism of six, and one of the nodes has six available CPUs, then the slave processes to perform the parallel operation are spawned on those six CPUs, rather than spawning a single slave process on each of six different nodes.

Figure 5:
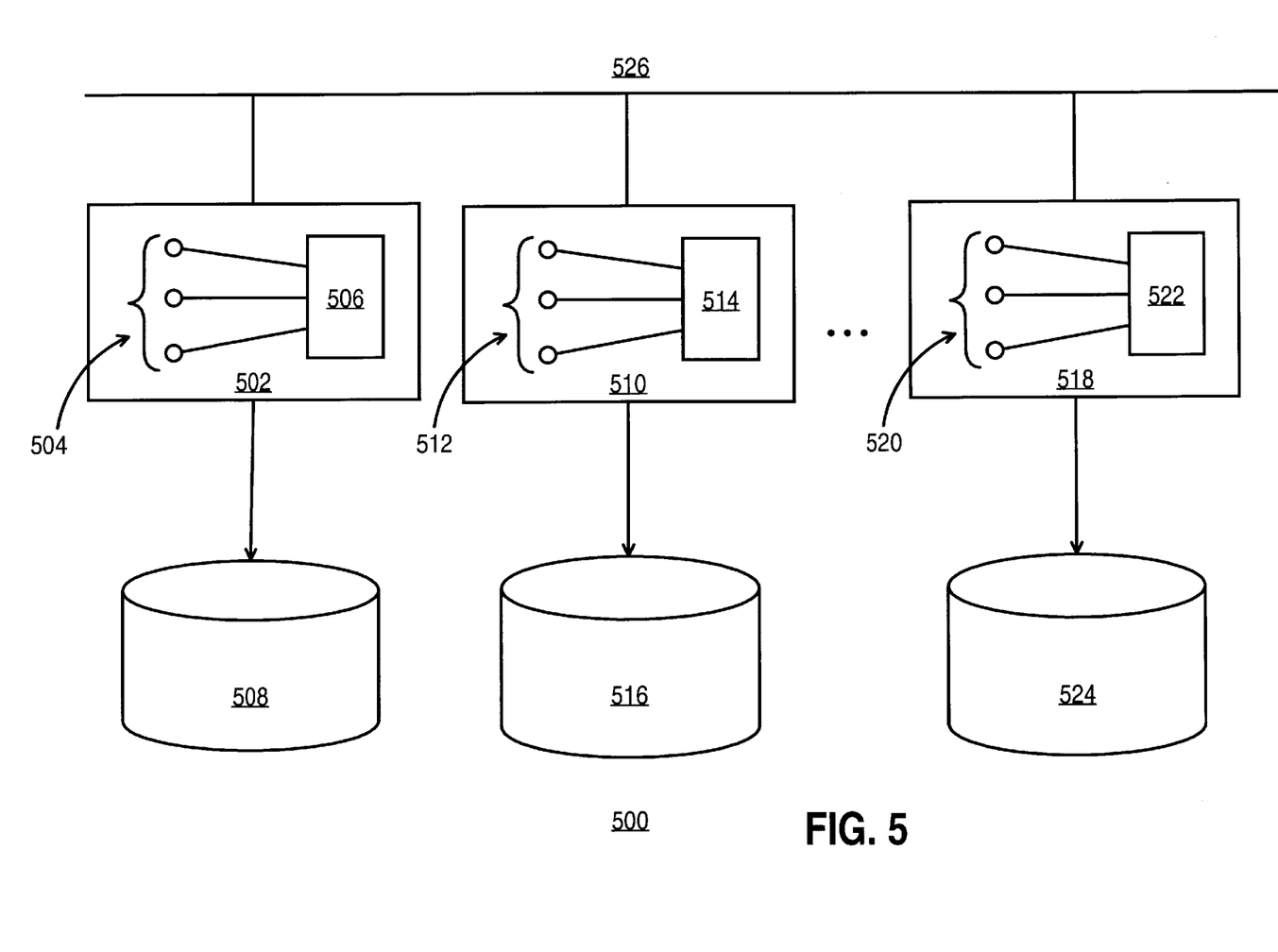
FIG. 5 illustrates a shared-nothing MPP computer system.

However, often there is an additional consideration as in the case of a shared-nothing MPP system. FIG. 5 represents a shared-nothing MPP system 500. System 500 includes any number of nodes, 502, 510, . . . 520. Each of the nodes has its own disk that the node can directly access. Node 502 directly accesses disk 508. Similarly, nodes 510 and 518 directly access disks 516 and 524 respectively. The nodes communicate via the interconnect 526. Each node is an SMP system comprising a shared dynamic memory and multiple CPUs. Memories 506, 514, and 522 are examples of dynamic memory. CPU sets 504, 512 and 520 are examples of sets of CPUs.

MPP system 500 is known as a shared-nothing system because each SMP node has its own disk that cannot be directly accessed by any other SMP node. The parallel process allocation for a shared-nothing MPP system is similar to that of the shared-disk MPP system. However, in the case of the shared-nothing MPP system, better performance is achieved by taking into account the device-to-node affinity. For example, a node is said to have affinity for a disk if the node can access the disk directly. For example, assume that the processing of a parallel operation X requires access to a data file stored on disk A. Under these circumstances, the slave processes for parallel operation X are most efficiently executed on the node that has affinity to disk A. However, if the processing of the parallel operation X requires access to data files stored on disk A and disk B, then the slave processes for parallel operation X are spawned on both the node that has affinity to disk A, and the node that has affinity to disk B. Thus, in a shared-nothing MPP system, the reduction of interconnectivity costs are constrained by node-to-disk affinity.

The factors used to determine parallel process allocation may vary from one implementation to another. According to one embodiment of the invention, parallel process allocation is performed according to the technique described by the flow charts of FIG. 6A and 6B.

Figure 6A:
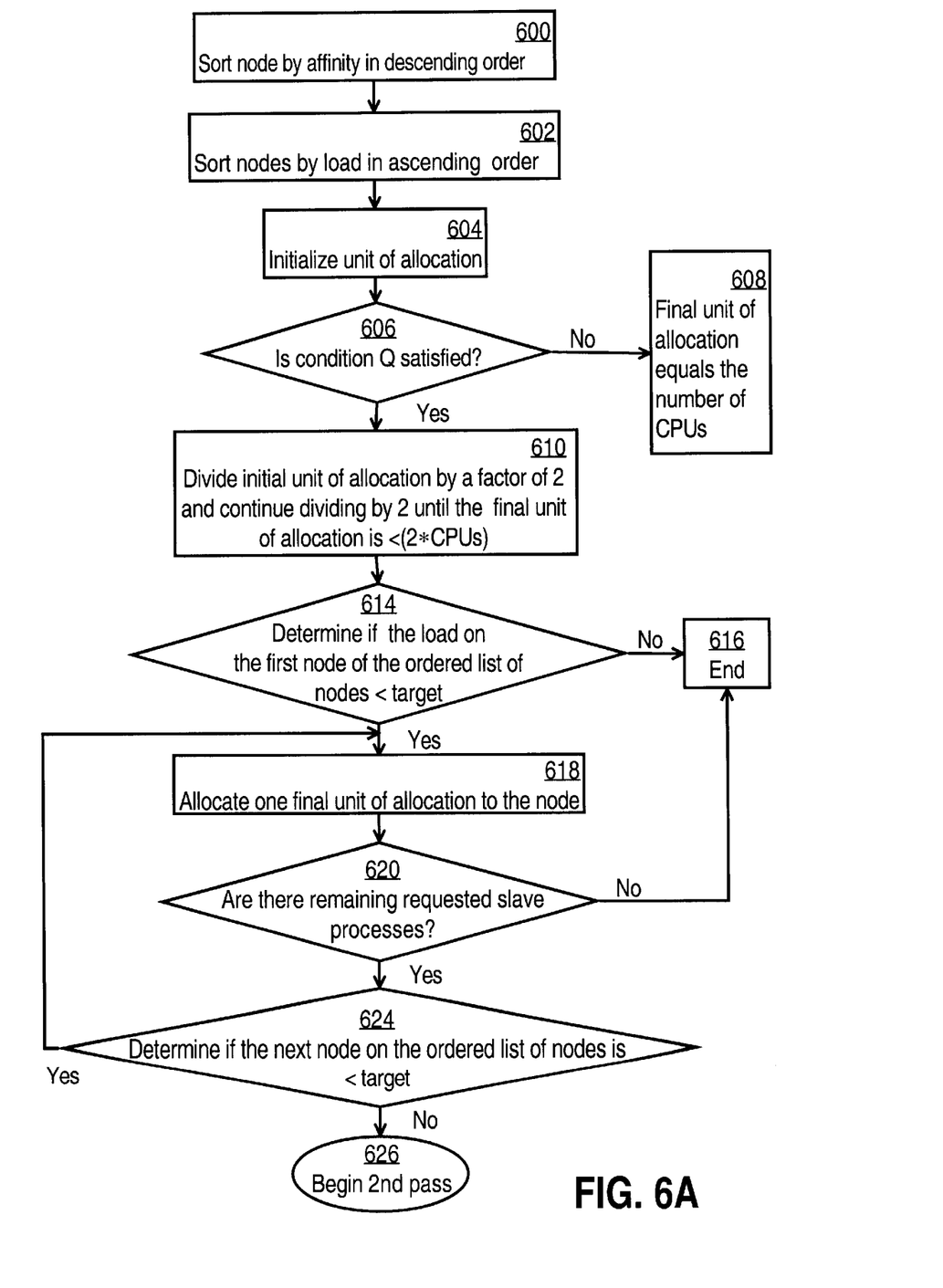
FIG. 6A is a flow chart describing the parallel process allocation among the processors.

In FIG. 6A, at block 600, for a given parallel operation entering the system that has been assigned a degree of parallelism as described above, the nodes of the MPP are sorted by affinity in descending order. For shared-disk MPP system, this step is skipped. At block 602, the nodes are sorted by the load in ascending order. The first node of the sorted list has the highest affinity with respect to the entering parallel operation and the lowest load on the MPP at the time of entry of the parallel operation.

A unit of allocation is the unit of slave processes. The unit of allocation is determined in the manner described below.

At block 604, the unit of allocation is initialized to the total number of slave processes that are to be spawned (as dictated by the degree of parallelism assigned to the incoming parallel operation) divided by the total number of nodes on the MPP. The slave processes to be spawned for an incoming parallel operation will hereafter be referred to as the "requested slave processes" of the parallel operation. The unit of allocation that is initialized at block 604 will hereafter be referred to as the "initial unit of allocation".

At block 606, it is determined whether the current state of the MPP system satisfies a particular condition (referred to herein as "Condition Q"). Condition Q is as follows:

The difference between the least loaded node and the most loaded node is small;
AND
The number of requested slave processes of the incoming parallel operation is not wholly divisible by the number of nodes (i.e.; divisible with no remainder)
AND
The number of requested slave processes of the incoming parallel operation divided by the number of nodes is greater than or equal to two;
AND
The number of requested slave processes of the incoming parallel operation does not all fit in one node.

If Condition Q is not satisfied, then at block 608 the unit of allocation is set to the number of CPUs on the MPP system. However, if Condition Q is satisfied, then at block 610, the initial unit of allocation is repeatedly divided by 2 until the resulting unit of allocation is less than twice the number of CPUs on the MPP system. The resulting unit of allocation is hereafter referred to as the "final unit of allocation". The final units of allocation are assigned to the nodes in the manner detailed below. The total number of final units of allocation assigned to a node times the value per final unit of allocation is the total number of slave processes that are to be spawned on that node with respect to the incoming parallel operation.

At block 614, it is determined whether the load on the first node on the sorted list is less than the target. If the load is not less than the target, then at block 616, the process of allocation ends because the system resources are overcommitted. In one embodiment of the invention, no more slave processes will be spawned until resources become available.

If at block 614, it is determined that the load on the first node in the sorted list is less than target, then at block 618, one final unit of allocation is assigned to that node. Note that this is the first pass ("first sequence") in the process of distributing the requested slave processes for the incoming parallel operation among the nodes, and that more final units of allocation may be assigned to the same node during subsequent passes.

At block 620, it is determined, for the incoming parallel operation, if there are remaining requested slave processes to be allocated among the nodes. If there are no remaining requested slave processes, then the parallel process allocation is complete for that particular incoming parallel operation. Otherwise, at block 624 it is determined if the load on the next node in the sorted list of nodes is less than target. If the load is less than target, then control passes back to block 618 where a final unit of allocation is assigned to the node. Otherwise, control passes to block 626, the beginning of the second pass ("second sequence"). The second sequence in described by FIG. 6B.

Figure 6B:
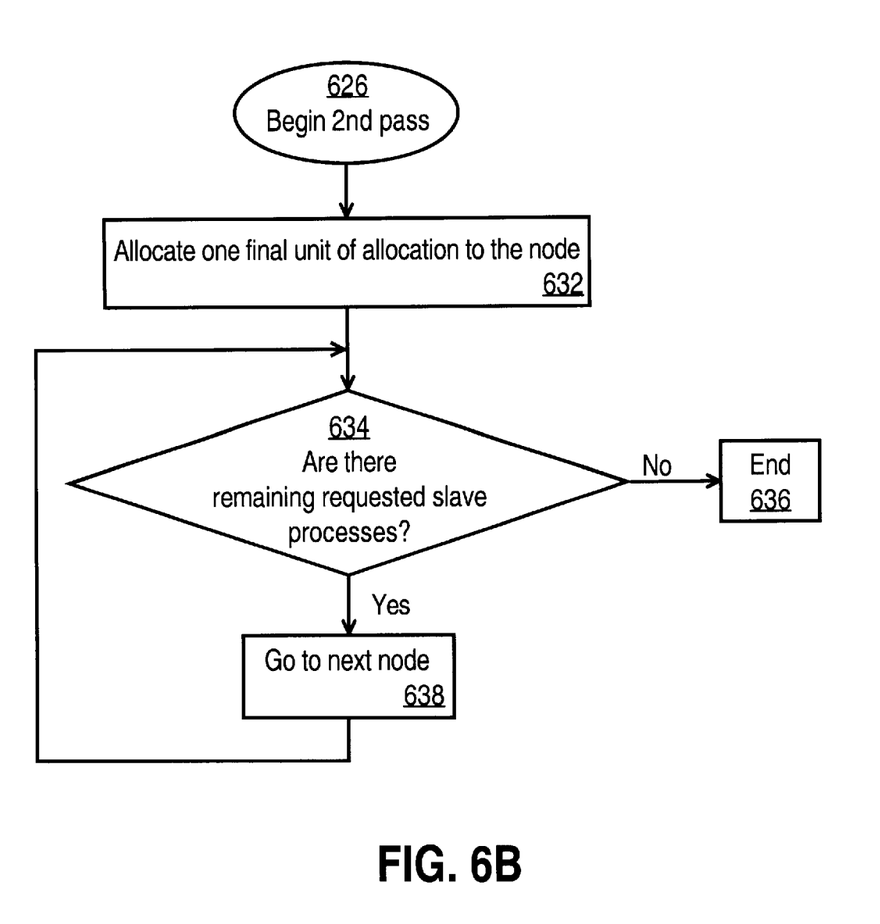
FIG. 6B is a flow chart describing the parallel process allocation among the processors.

FIG. 6B is a flow chart describing the steps in the remainder of the parallel process allocation for an incoming parallel operation. At block 632 the first node of the sorted list of nodes is assigned a final unit of allocation.

At block 634, it is determined, for the incoming parallel operation, if there are remaining requested slave processes to be allocated among the nodes. If there are no remaining requested slave processes, then the parallel process allocation is complete for that particular incoming parallel operation, and control passes to block 636. Otherwise, at block 638 the next node on the sorted list is visited. The steps in blocks 634 and 638 are repeated until there are no remaining requested slave processes. When there are no remaining requested slave processes, the parallel process allocation is complete for that particular incoming parallel operation, and control passes to block 636.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for computing degrees of parallelism for parallel operations in a computer system, the method comprising the steps of:

receiving a request to perform a parallel operation;

computing the degree of parallelism for the parallel operation based on a set of factors, wherein the set of factors includes a target degree of parallelism that represents a desired total amount of parallelism in the computer system, and a current workload of the computer system; and assigning the degree of parallelism to the parallel operation.

2. The method of claim 1 wherein:

the parallel operation is associated with a requested degree of parallelism; and the requested degree of parallelism associated with the parallel operation is also a factor in the set of factors used to compute the degree of parallelism.

3. The method of claim 2 further comprising the step of, when the requested degree of parallelism is not predetermined for the parallel operation, assigning to the parallel operation the target degree of parallelism as the requested degree of parallelism for the parallel operation.

4. The method of claim 1 further comprising the step of assigning the target degree of parallelism to the parallel operation when the current workload of the computer system is zero.

5. The method of claim 2 further comprising the step of assigning the requested degree of parallelism to the parallel operation when the current workload of the computer system is zero.

6. The method of claim 1 wherein the target degree of parallelism is equal to twice the number of processors in the computer system.

7. The method of claim 1 wherein the set of factors includes a reduction factor;

the step of computing the degree of parallelism for the parallel operation further comprises the steps of:

computing the reduction factor; and applying the reduction factor to a requested degree of parallelism.

8. The method of claim 7 wherein the step of computing the reduction factor comprises the steps of:

computing a projected load factor; and computing a rate of change based on a total number of parallel operations on the computer system.

9. The method of claim 7 wherein the step of computing the reduction factor comprises computing a rate of change based on a user_limit and a user_ratio wherein:

the user_limit is an upper limit on the number of parallel operations; and the user_ratio is the number of parallel operations.

10. The method of claim 9 wherein the user_limit is the upper limit on the number of parallel users and the user_ratio is the number of parallel users.

11. The method of claim 9 wherein the user_ratio is a run queue length.

12. The method of claim 9 wherein the user_ratio is an amount of memory being used in the computer system.

13. The method of claim 7 wherein the step of computing the reduction factor is based on a default degree of parallelism.

14. The method of claim 13 wherein the default degree of parallelism is equal to twice the number of processors in the computer system.

15. The method of claim 7 wherein the step of applying the reduction factor to the requested degree of parallelism is dividing the requested degree of parallelism by the reduction factor.

16. The method of claim 7 further comprises equating the degree of parallelism of the parallel operation to the requested degree of parallelism if the reduction factor is zero.

17. The method of claim 1 wherein the computer system comprises more than one node and wherein each node comprises multiple processors.

18. The method of claim 17 wherein:

requested slave processes are distributed among the nodes;

the requested slave processes are slave processes equal to the degree of parallelism assigned to the parallel operation;

a unit of allocation is a fraction of the number of requested slave processes;

the method of distributing the requested slave processes among the nodes comprises the steps of:

sorting the nodes by workload in ascending order to obtain a sorted list of nodes;

beginning a first sequence by allocating a final unit of allocation to a first node on the sorted list of nodes if the first node has a workload that is less than a target workload; and continuing to allocate the final unit of allocation to successive nodes on the sorted list of nodes if the workload on each successive node is less than the target workload and if requested slave processes remain undistributed;

returning to the first node of the sorted list of nodes upon reaching a node having workload greater than the target workload;

beginning a second sequence for allocating the final unit of allocation to the first node on the sorted list of nodes if requested slave processes remain undistributed;

continuing to allocate the final unit of allocation to successive nodes on the sorted list of nodes if requested slave processes remain undistributed;

repeating the second sequence upon reaching the end of the sorted list of nodes; and continuing to repeat the second sequence if requested slave processes remain undistributed.

19. The method of claim 18 further comprises the steps of:

calculating the final unit of allocation if a set of conditions are satisfied; and setting the final unit of allocation equal to the number of processors on the computer system if the set of conditions are not satisfied.

20. The method of claim 19 wherein the set of conditions include:
the difference between a least loaded node and a most loaded node is small;
the requested slave processes are not completely divisible by the number of nodes;
the requested slave processes, when divided by the number of nodes, is greater than or equal to 2; and
the requested slave processes do not all fit in one node.

21. The method of claim 19 wherein the step of calculating the final unit of allocation further comprises the steps of:
initializing the unit of allocation to create an initial unit of allocation equal to the number of requested slave processes; and
reducing the initial unit of allocation to produce the final unit of allocation by successively dividing the initial unit of allocation by a factor of two until the final unit of allocation is less than the number of processors on the computer system.

22. The method of claim 18 wherein the requested slave processes are not distributed if the first node on the sorted list of nodes has the workload that is greater than the target workload and wherein the target workload is the number of slave processes equal to twice the number of processors on the computer system.

23. A computer-readable medium carrying one or more sequences of instructions for computing degrees of parallelism for parallel operations in a computer system, wherein execution of the one or more sequences of instructions by one or more processors causes the one or more processors to perform the steps of:
receiving a request to perform a parallel operation;
computing the degree of parallelism for the parallel operation based on a set of factors, wherein the set of factors includes
a target degree of parallelism that represents a desired total amount of parallelism in the computer system, and
a current workload of the computer system; and
assigning the degree of parallelism to the parallel operation.

24. The computer readable medium of claim 23 wherein:
the parallel operation is associated with a requested degree of parallelism; and
the requested degree of parallelism associated with the parallel operation is also a factor in the set of factors used to compute the degree of parallelism.

25. The computer readable medium of claim 24 further comprising the step of, when the requested degree of parallelism is not pre-determined for the parallel operation, assigning to the parallel operation the target degree of parallelism as the requested degree of parallelism for the parallel operation.

26. The computer readable medium of claim 23 further comprising the step of assigning the target degree of parallelism to the parallel operation when the current workload of the computer system is zero.

27. The computer readable medium of claim 24 further comprising the step of assigning the requested degree of parallelism to the parallel operation when the current workload of the computer system is zero.

28. The computer readable medium of claim 23 wherein the target degree of parallelism is equal to twice the number of processors in the computer system.

29. The computer readable medium of claim 23 wherein the set of factors includes a reduction factor;
the step of computing the degree of parallelism for the parallel operation further comprises the steps of:
computing the reduction factor; and
applying the reduction factor to a requested degree of parallelism.

30. The computer readable medium of claim 29 wherein the step of computing the reduction factor comprises the steps of:
computing a projected load factor; and
computing a rate of change based on a total number of parallel operations on the computer system.

31. The computer readable medium of claim 29 wherein the step of computing the reduction factor comprises computing a rate of change based on a user_limit and a user_ratio wherein:
the user_limit is an upper limit on the number of parallel operations; and
the user_ratio is the number of parallel operations.

32. The computer readable medium of claim 31 wherein the user_limit is the upper limit on the number of parallel users and the user_ratio is the number of parallel users.

33. The computer readable medium of claim 31 wherein the user_ratio is a run queue length.

34. The computer readable medium of claim 31 wherein the user_ratio is an amount of memory being used in the computer system.

35. The computer readable medium of claim 29 wherein the step of computing the reduction factor is based on a default degree of parallelism.

36. The computer readable medium of claim 35 wherein the default degree of parallelism is equal to twice the number of processors in the computer system.

37. The computer readable medium of claim 29 wherein the step of applying the reduction factor to the requested degree of parallelism is dividing the requested degree of parallelism by the reduction factor.

38. The computer readable medium of claim 29 further comprises equating the degree of parallelism of the parallel operation to the requested degree of parallelism if the reduction factor is zero.

39. The computer readable medium of claim 23 wherein the computer system comprises more than one node and wherein each node comprises multiple processors.

40. The computer readable medium of claim 39 wherein:
requested slave processes are distributed among the nodes;
the requested slave processes are slave processes equal to the degree of parallelism assigned to the parallel operation;
a unit of allocation is a fraction of the number of requested slave processes;
the method of distributing the requested slave processes among the nodes comprises the steps of:
sorting the nodes by workload in ascending order to obtain a sorted list of nodes;
beginning a first sequence by allocating a final unit of allocation to a first node on the sorted list of nodes if the first node has a workload that is less than a target workload; and
continuing to allocate the final unit of allocation to successive nodes on the sorted list of nodes if the workload on each successive node is less than the target workload and if requested slave processes remain undistributed;

returning to the first node of the sorted list of nodes upon reaching a node having workload greater than the target workload;

beginning a second sequence for allocating the final unit of allocation to the first node on the sorted list of nodes if requested slave processes remain undistributed;

continuing to allocate the final unit of allocation to successive nodes on the sorted list of nodes if requested slave processes remain undistributed;

repeating the second sequence upon reaching the end of the sorted list of nodes; and continuing to repeat the second sequence if requested slave processes remain undistributed.

41. The computer readable medium of claim 40 further comprises the steps of:

calculating the final unit of allocation if a set of conditions are satisfied; and setting the final unit of allocation equal to the number of processors on the computer system if the set of conditions are not satisfied.

42. The computer readable medium of claim 41 wherein the set of conditions include:

the difference between a least loaded node and a most loaded node is small;

the requested slave processes are not completely divisible by the number of nodes;

the requested slave processes, when divided by the number of nodes, is greater than or equal to 2; and the requested slave processes do not all fit in one node.

43. The computer readable medium of claim 41 wherein the step of calculating the final unit of allocation further comprises the steps of:

initializing the unit of allocation to create an initial unit of allocation equal to the number of requested slave processes; and reducing the initial unit of allocation to produce the final unit of allocation by successively dividing the initial unit of allocation by a factor of two until the final unit of allocation is less than the number of processors on the computer system.

44. The computer readable medium of claim 40 wherein the requested slave processes are not distributed if the first node on the sorted list of nodes has the workload that is greater than the target workload and wherein the target workload is the number of slave processes equal to twice the number of processors on the computer system.

45. A system for computing degrees of parallelism for parallel operations in a computer system, the system comprising a memory having one or more sequences of instructions, wherein execution of the one or more sequences of instructions by one or more processors causes the one or more processors to perform the steps of:

receiving a request to perform a parallel operation;

computing the degree of parallelism for the parallel operation based on a set of factors, wherein the set of factors includes a target degree of parallelism that represents a desired total amount of parallelism in the computer system, and a current workload of the computer system; and assigning the degree of parallelism to the parallel operation.

46. The system of claim 45, wherein:

the parallel operation is associated with a requested degree of parallelism; and the requested degree of parallelism associated with the parallel operation is also a factor in the set of factors used to compute the degree of parallelism.

47. The system of claim 46, wherein the memory further comprises one or more additional sequences of instructions which, when executed by the one or more processors, cause the one or more processors to perform the step of, when the requested degree of parallelism is not pre-determined for the parallel operation, assigning to the parallel operation the target degree of parallelism as the requested degree of parallelism for the parallel operation.

48. The system of claim 45, wherein the memory further comprises one or more additional sequences of instructions which, when executed by the one or more processors, cause the one or more processors to perform the step of assigning the target degree of parallelism to the parallel operation when the current workload of the computer system is zero.

49. The system of claim 46, wherein the memory further comprises one or more additional sequences of instructions which, when executed by the one or more processors, cause the one or more processors to perform the step of assigning the requested degree of parallelism to the parallel operation when the current workload of the computer system is zero.

50. The system of claim 45, wherein the target degree of parallelism is equal to twice the number of processors in the computer system.

51. The system of claim 45, wherein the set of factors includes a reduction factor;

the step of computing the degree of parallelism for the parallel operation includes:

computing the reduction factor; and applying the reduction factor to a requested degree of parallelism.

52. The system of claim 51, wherein the step of computing the reduction factor includes:

computing a projected load factor; and computing a rate of change based on a total number of parallel operations on the computer system.

53. The system of claim 51, wherein the step of computing the reduction factor includes computing a rate of change based on a user_limit and a user_ratio wherein:

the user_limit is an upper limit on the number of parallel operations; and the user_ratio is the number of parallel operations.

54. The system of claim 53, wherein the user_limit is the upper limit on the number of parallel users and the user_ratio is the number of parallel users.

55. The system of claim 53, wherein the user_ratio is a run queue length.

56. The system of claim 53, wherein the user_ratio is an amount of memory being used in the computer system.

57. The system of claim 51, wherein the step of computing the reduction factor is based on a default degree of parallelism.

58. The system of claim 57, wherein the default degree of parallelism is equal to twice the number of processors in the computer system.

59. The system of claim 51, wherein the step of applying the reduction factor to the requested degree of parallelism is dividing the requested degree of parallelism by the reduction factor.

60. The system of claim 51, wherein the memory further comprises one or more additional sequences of instructions which, when executed by the one or more processors, cause the one or more processors to perform the step of equating the degree of parallelism of the parallel operation to the requested degree of parallelism if the reduction factor is zero.

61. The system of claim 45, wherein the computer system comprises more than one node and wherein each node comprises multiple processors.

62. The system of claim 61, wherein:
- requested slave processes are distributed among the nodes;
- the requested slave processes are slave processes equal to the degree of parallelism assigned to the parallel operation;
- a unit of allocation is a fraction of the number of requested slave processes;
- distributing the requested slave processes among the nodes includes:
  - sorting the nodes by workload in ascending order to obtain a sorted list of nodes;
  - beginning a first sequence by allocating a final unit of allocation to a first node on the sorted list of nodes if the first node has a workload that is less than a target workload; and
  - continuing to allocate the final unit of allocation to successive nodes on the sorted list of nodes if the workload on each successive node is less than the target workload and if requested slave processes remain undistributed;
  - returning to the first node of the sorted list of nodes upon reaching a node having workload greater than the target workload;
  - beginning a second sequence for allocating the final unit of allocation to the first node on the sorted list of nodes if requested slave processes remain undistributed;
  - continuing to allocate the final unit of allocation to successive nodes on the sorted list of nodes if requested slave processes remain undistributed;
  - repeating the second sequence upon reaching the end of the sorted list of nodes; and
  - continuing to repeat the second sequence if requested slave processes remain undistributed.

63. The system of claim 62, wherein the memory further comprises one or more additional sequences of instructions which, when executed by the one or more processors, cause the one or more processors to perform the steps of:
- calculating the final unit of allocation if a set of conditions are satisfied; and
- setting the final unit of allocation equal to the number of processors on the computer system if the set of conditions are not satisfied.

64. The system of claim 63, wherein the set of conditions include:
- the difference between a least loaded node and a most loaded node is small;
- the requested slave processes are not completely divisible by the number of nodes;
- the requested slave processes, when divided by the number of nodes, is greater than or equal to two; and
- the requested slave processes do not all fit in one nodes.

65. The system of claim 63, wherein the step of calculating the final unit of allocation includes:
- initializing the unit of allocation to create an initial unit of allocation equal to the number of requested slave processes; and
- reducing the initial unit of allocation to produce the final unit of allocation by successively dividing the initial unit of allocation by a factor of two until the final unit of allocation is less than the number of processors on the computer system.

66. The system of claim 62, wherein the requested slave processes are not distributed if the first node on the sorted list of nodes has the workload that is greater than the target workload and wherein the target workload is the number of slave processes equal to twice the number of processors on the computer system.

* * * * *

UNITED STATES PATENT AND TRADEMARK OFFICE
CERTIFICATE OF CORRECTION

PATENT NO. : 6,820,262 B1 Page 1 of 1
DATED : November 16, 2004
INVENTOR(S) : Juan Tellez et al.

It is certified that error appears in the above-identified patent and that said Letters Patent is hereby corrected as shown below:

<u>Column 20,</u>
Line 60, please delete the last word "nodes" and replace with -- node --.

Signed and Sealed this

Eighth Day of March, 2005

JON W. DUDAS
*Director of the United States Patent and Trademark Office*